(12) United States Patent
Shuhami

(10) Patent No.: US 7,411,578 B2
(45) Date of Patent: Aug. 12, 2008

(54) DIGITAL PHOTO ALBUM

(75) Inventor: Jacob Shuhami, Moshav Beit Yitzhak (IL)

(73) Assignee: D-Magic Technologies Ltd., Even-Yehuda (IL)

( * ) Notice: Subject to any disclaimer, the term of this patent is extended or adjusted under 35 U.S.C. 154(b) by 81 days.

(21) Appl. No.: 11/400,225

(22) Filed: Apr. 10, 2006

(65) Prior Publication Data

US 2006/0233536 A1    Oct. 19, 2006

Related U.S. Application Data

(60) Provisional application No. 60/671,478, filed on Apr. 15, 2005.

(51) Int. Cl.
*G09G 5/00* (2006.01)
(52) U.S. Cl. .................. 345/156; 345/173; 348/333.05; 434/317
(58) Field of Classification Search ......... 345/156–158, 345/173, 204; 348/211.3, 333.02, 333.05; 715/784–786; 434/317
See application file for complete search history.

(56) References Cited

U.S. PATENT DOCUMENTS

| | | | | |
|---|---|---|---|---|
| 4,855,725 A | * | 8/1989 | Fernandez | 345/173 |
| 5,109,354 A | * | 4/1992 | Yamashita et al. | 708/110 |
| 5,703,624 A | * | 12/1997 | van Kruistum | 345/169 |
| 5,847,698 A | * | 12/1998 | Reavey et al. | 345/173 |
| 5,896,575 A | * | 4/1999 | Higginbotham et al. | 455/566 |
| 6,072,487 A | * | 6/2000 | Kakuta et al. | 345/684 |
| 6,919,877 B2 | * | 7/2005 | Hong | 345/156 |
| 2004/0169757 A1 | * | 9/2004 | Amachree | 348/333.05 |
| 2006/0209214 A1 | * | 9/2006 | Fader et al. | 348/584 |

\* cited by examiner

*Primary Examiner*—Richard Hjerpe
*Assistant Examiner*—Kimnhung Nguyen

(57) ABSTRACT

A box structure with an external appearance of a photo album and configured to electronically display digital images, the structure comprising: (a) a front cover for the box structure, the cover being connected to the box structure along an edge such that the cover is configured to pivot along the edge; (b) a data input port to receive incoming data of images for display; (c) an electronic data processing device, located within the box and connected to the input port, configured to receive the incoming data from the input port and process the incoming data; and (d) a display associated with the processing device configured to display the electronic images and disposed on the box structure against the front cover such that upon opening the front cover the display is visible.

17 Claims, 15 Drawing Sheets

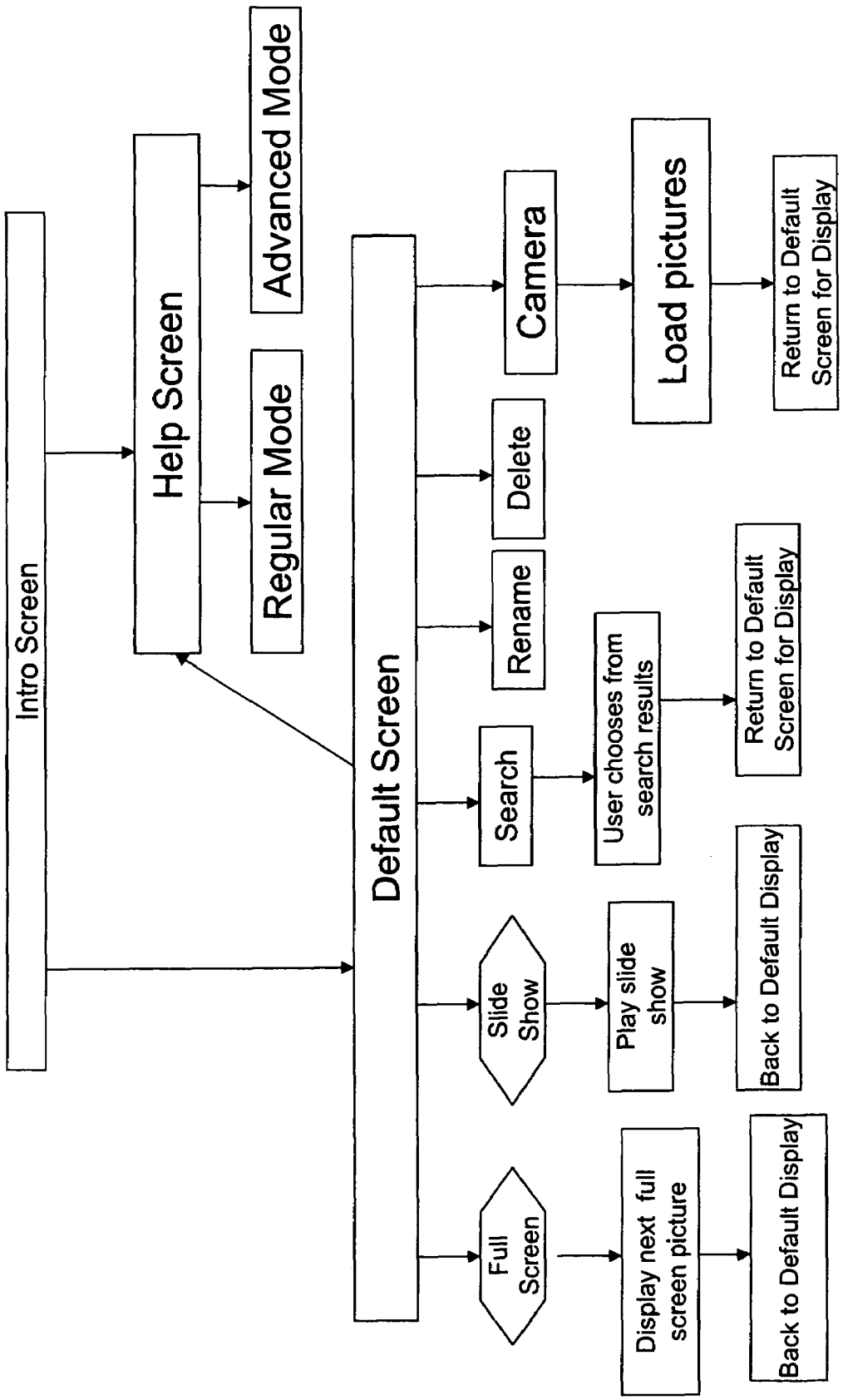

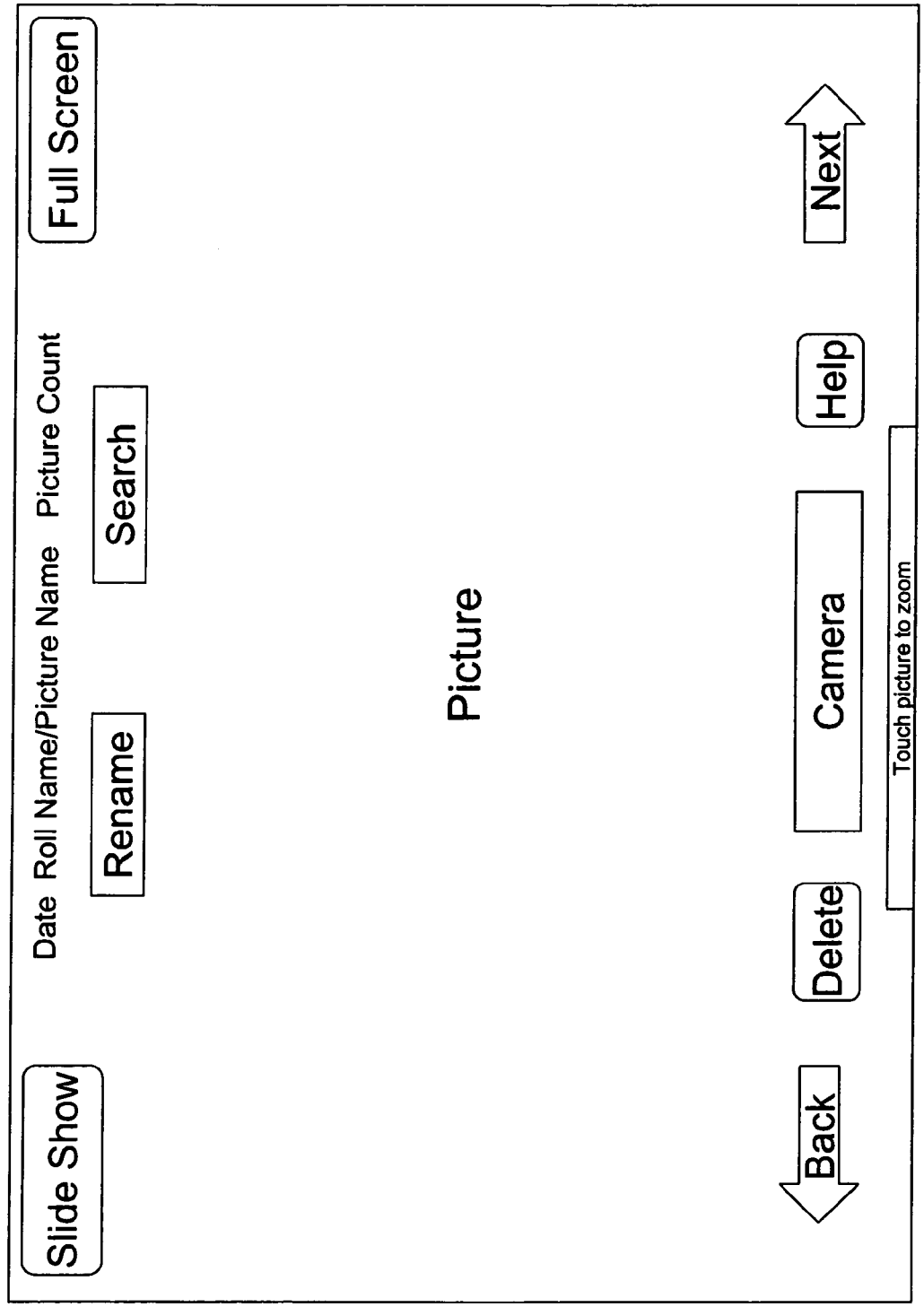
Fig 9a  Default Display Mode

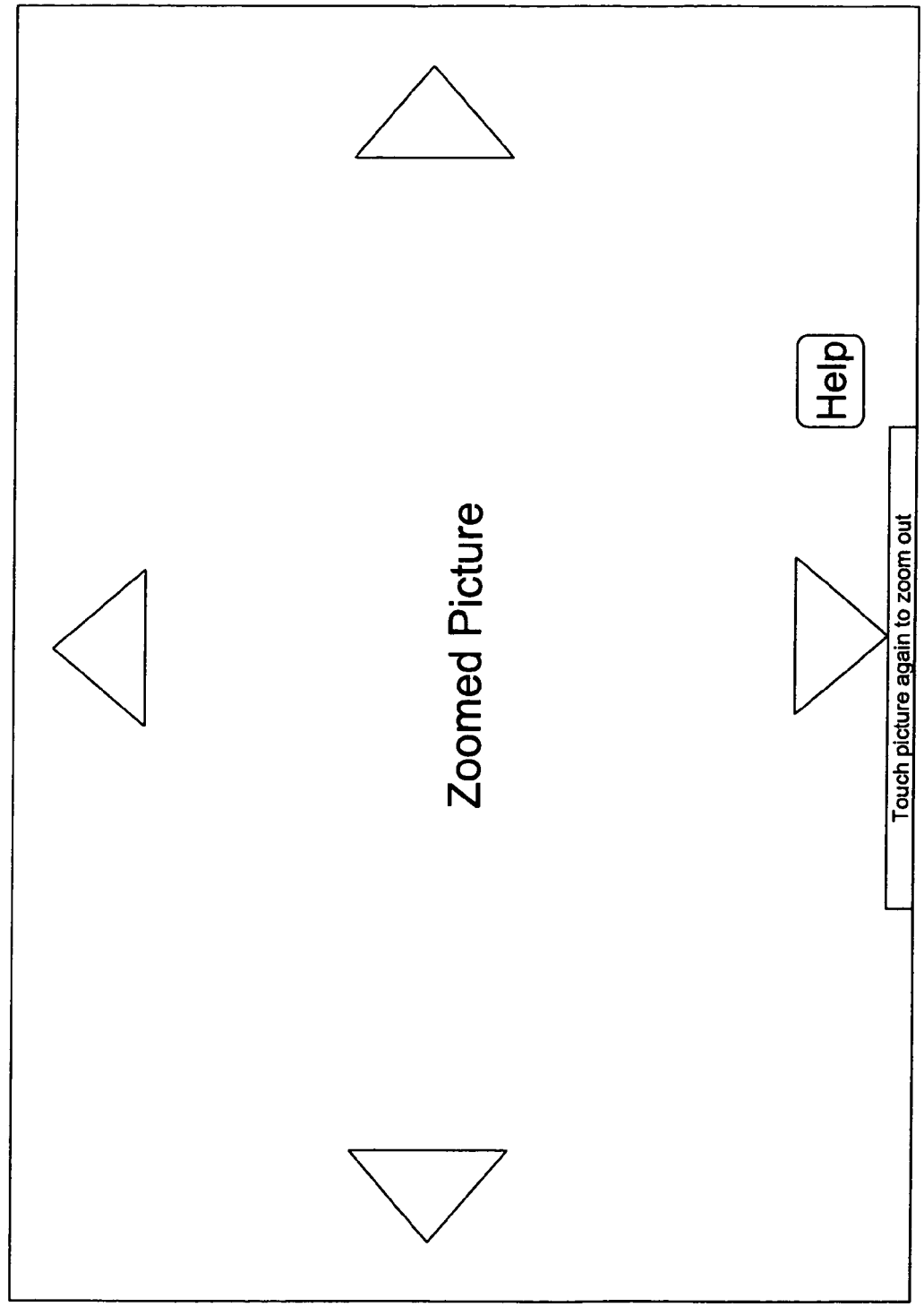

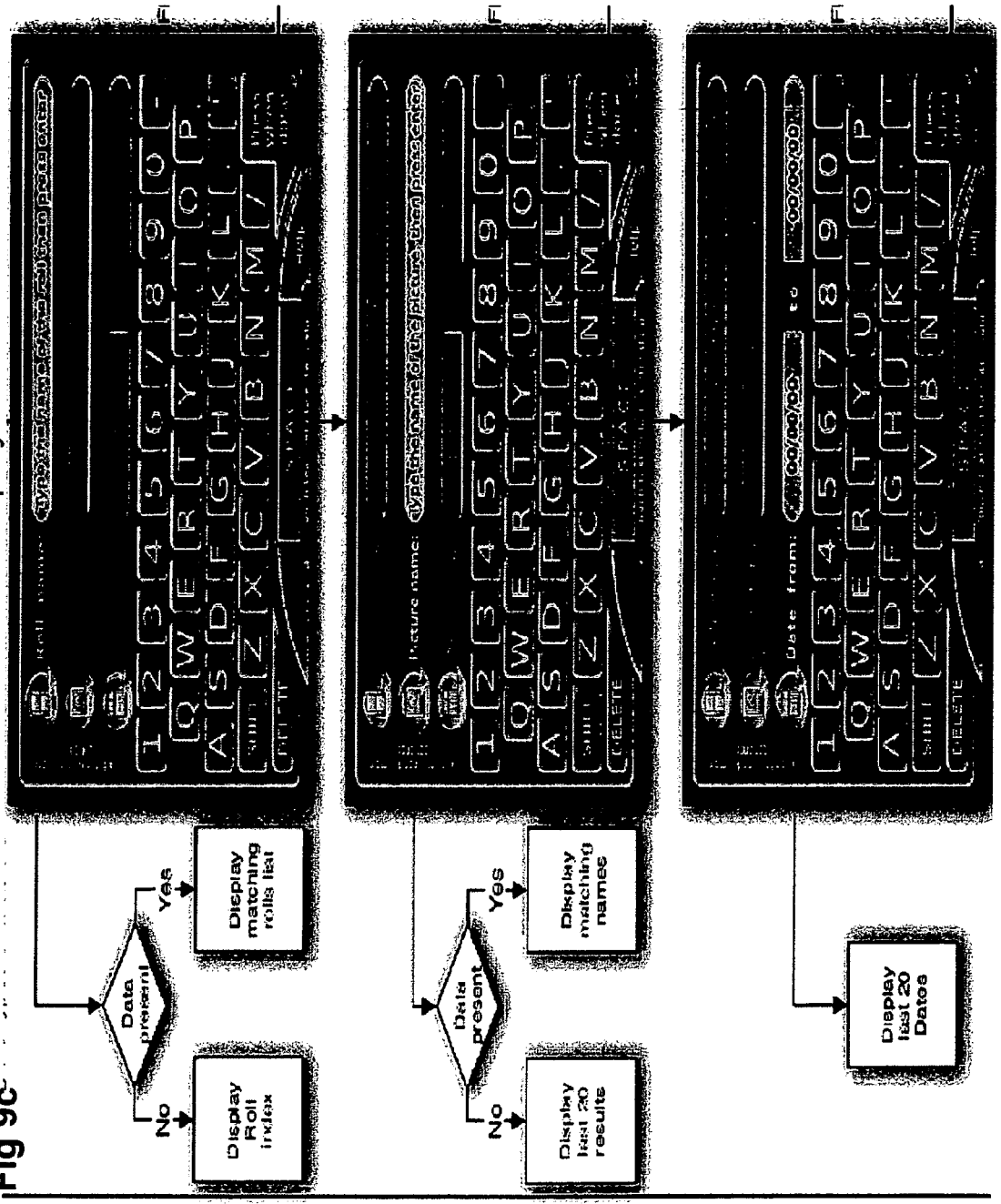

DIGITAL PHOTO ALBUM

RELATIONSHIP TO EXISTING APPLICATIONS

The present application claims priority from U.S. provisional patent No. 60/671,478 filed on Apr. 15, 2005, the contents of which are hereby incorporated by reference.

FIELD AND BACKGROUND OF THE INVENTION

The present invention relates to a digital photo album.

Digital cameras have become extraordinarily popular in the last several years among consumers worldwide. Statistics show more than 150 million people worldwide own digital cameras. One of the key features of digital cameras is the ability to view pictures directly on the camera or another device such as a computer without having to develop film, thus saving time and money. Furthermore, a mass storage device is typically used on the camera to store photos, and it is possible to capture photos and then erase them, allowing virtually unlimited photo taking without the need to physically develop a film.

Several options exist today to view digital photos. Pictures may be viewed directly on the digital camera screen. It is possible to view digital pictures that are burned onto a mobile storage device, such as a CD or VCD, on a computer screen. Digital photos can furthermore be uploaded from a digital camera to the Internet using appropriate software. They can of course be printed using a traditional photograph laboratory as more traditional film-based photographs are.

However, in all the above examples, what is clearly lacking is the comfort of viewing the digital pictures in the old fashioned way through an album. Particularly those individuals who lack sufficient computer skills to view digital pictures on a computer, would rather be able to view pictures in an album format. Further, the social aspects involved in sharing pictures with family and friends is more appreciated when the pictures are viewable in the "classic" format, that is to say in a personal or family photo album.

The digital camera market can be divided into three main population groups. The first one is the group of technology oriented users. This group represents those that are familiar with digital technology, and utilize with ease computer technology and the Internet for storage and viewing of digital photos. Nonetheless, this group may still wish to use printed digital photos for storage in a classic photo album for presentation. The second group represents those that own digital cameras but lack familiarity with computers and therefore will always print digital pictures and view them in a classic photo album. Finally, the third group of people are those that have chosen not to purchase a digital camera as a result of little or no computer knowledge or skills.

Therefore, there is an unmet need for, and it would be highly useful to have, a digital photo album to which digital pictures are easily transferred for comfortable viewing.

SUMMARY OF THE INVENTION

According to one aspect of the present invention there is provided a box structure with an external appearance of a photo album and configured to electronically display digital images, said structure comprising:

a front cover for said box structure, said cover being connected to said box structure along an edge such that said cover is configured to pivot along said edge;

a data input port to receive incoming data of images for display;

an electronic data processing device, located within said box and connected to said input port, configured to receive said incoming data from said input port and process said incoming data; and a display associated with said processing device configured to display said electronic images and disposed on said box structure.

According to a second aspect of the present invention there is provided a box structure with an external appearance of a photo album and configured to electronically display digital images, said structure comprising:

a front cover for said box structure, said cover being connected to said box structure along an edge such that said cover is configured to pivot along said edge;

an electronic data processing device, located within said box, a touch screen user interface associated with said processing device configured to display said electronic images and interact with said user, said touch screen being disposed on said box structure.

According to a third aspect of the present invention there is provided a picture frame configured to electronically display digital images, said picture frame comprising:

a data input port to receive incoming data of images for display;

an electronic data processing device, located within said picture frame and connected to said input port, configured to receive said incoming data from said input port and process said incoming data; and a display associated with said processing device configured to display said electronic images and disposed within said picture frame.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected stages of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 8 shows a flow chart for the operation of the DPA;

FIG. 9A is a simplified view of the default display user interface touch screen;

FIG. 9B shows a simplified display in zoom mode;

FIG. 9C shows a flow chart and example screens for search mode;

DESCRIPTION OF THE PREFERRED EMBODIMENTS

Figure 1:
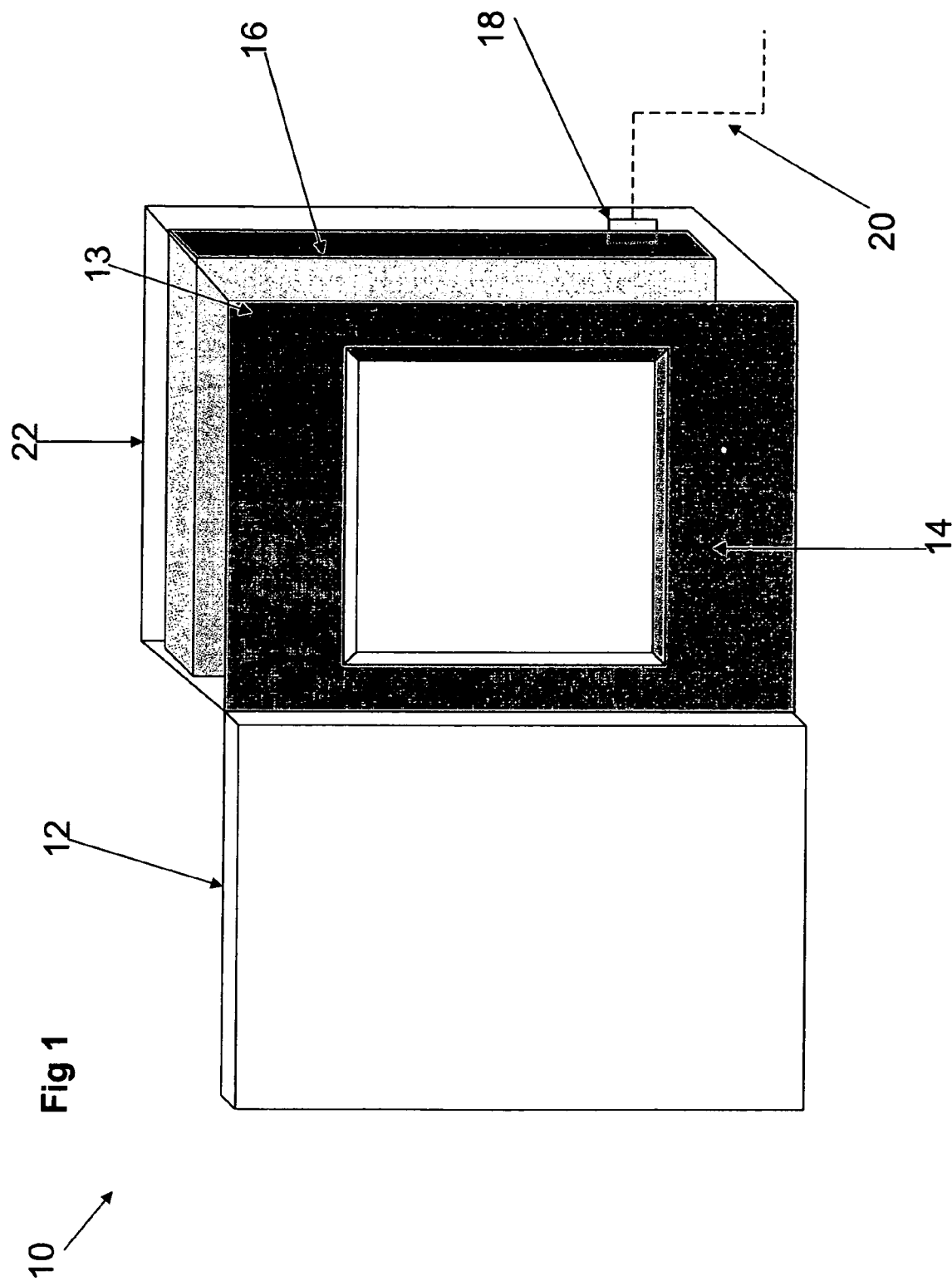
FIG. 1 is a simplified diagram illustrating a generalized embodiment of the present invention.

The present embodiments provide an apparatus for a digital photo album in which digital images are displayed. The digital photo album, or DPA, has the external features and appearance of a conventional photo album used to store and view film pictures. The purpose of the digital album is to view digital photos in the same fashion as conventional prints from film are viewed. Preferably a digital camera is able to download digital pictures to the DPA without the need for any intermediary computer or other peripheral involvement. The digital photo album is thus a standalone product, preferably portable, through which pictures can be viewed without the DPA being connected to any external device.

The DPA comprises a container structure of plastic or other like materials, with a screen disposed on or opposite the cover of the structure and connected to electronic circuitry inside the structure. Digital image data is transferred from a digital camera to the DPA electronic data processing unit through an input device on the processing unit. The pictures are then transferred to the screen. The screen allows for various viewing options, allowing the user to view the digital images in a similar manner to viewing conventional prints from film in an album.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is made to FIG. 1, which is a simplified diagram illustrating a generalized embodiment of the present invention. Album 10 contains box structure 22 having a front cover 12 that opens and closes along one side of the box structure. The front cover may have the name of the product engraved on its external side, or may be personalized for the user, such as the family name printed or engraved on the external side of the front cover. The back cover preferably contains the manufacturer's name and other logistic information. Colors and other external layouts may be varied, and preferably the external structure of the DPA will be designed in such a way as to allow for the album to fit into an external charging device when not in use. Box structure 22 contains a screen 14 for displaying digital images, and the screen is typically a touchscreen, as will be explained below. The screen is typically placed upwardly of container 22, such that, when front cover 12 is in a closed position, screen 14 is underneath the cover. In a preferred embodiment, screen 14 may be slightly smaller than top cover area 13, in which case an ornamental design may be engraved on top cover 13 around screen 14. Optionally, a first page may be placed between the front cover 12 and the screen 14, say to serve for writing personal notes or just to give the feel of a physical album. Below the screen inside the box structure, typically at least one electronic processing device 16 is placed and is preferably electronically connected to the screen. The electronic processing device additionally contains a data input port 18, through which it receives digital image data 20 for display on the screen 14.

Figure 2:
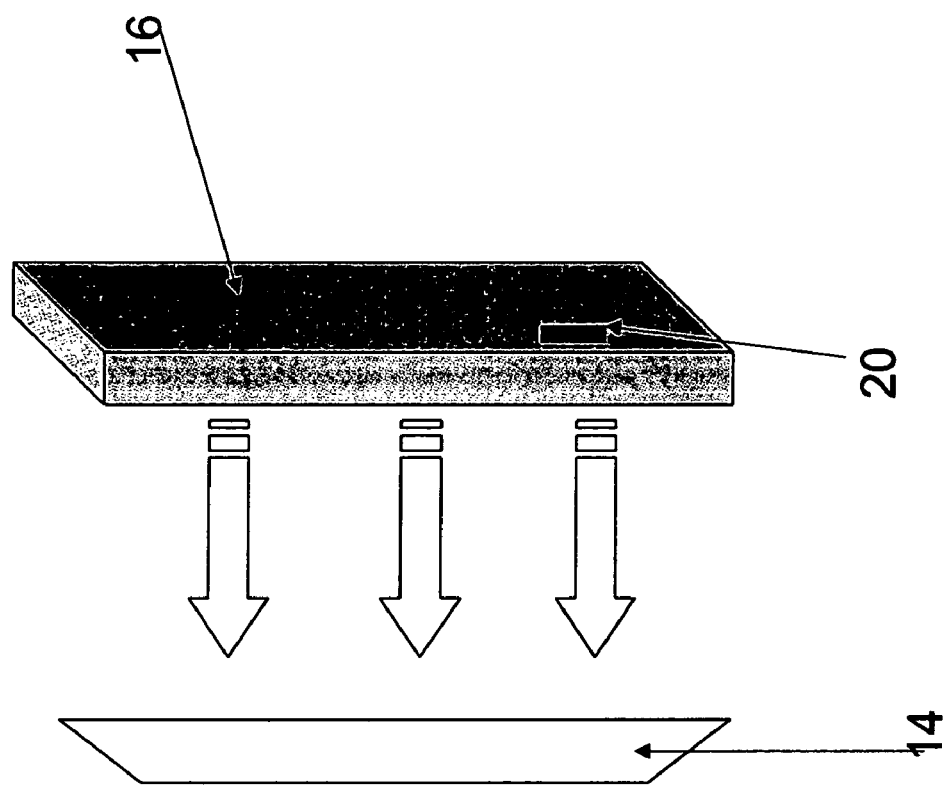
FIG. 2 is a schematic block diagram of information being transferred from the processing device according to a preferred embodiment of the present invention.

Reference is made to FIG. 2, which is a side view of the electronic processing device and screen in FIG. 1, showing data being transferred from the processing device according to a preferred embodiment of the present invention. Electronic processing device 16 receives digital image data at input port 20. The processing device is typically a microprocessor with low power consumption. Digital image data typically is received directly from a digital camera, but the input port 20 may also receive data from other devices, such as a CD drive, PC, laptop computer, or the Internet. The data input port may be for example a USB port or may be an Internet connection, such as an Ethernet card input. In a further embodiment, two albums herein described may contain input ports supporting Internet connections wherein the two albums communicate and share photos through the Internet. Alternatively or in addition to the above input port possibilities, an RS-232 serial interface may be provided, and/or there may be a Blue Tooth or other wireless communications link. The input port is preferably unobtrusively located on the back cover of the album. In still a further alternative, the input port may be configured to receive wireless data, using protocols such as WiFi 802. Once received, the data is transferred to display 14.

Figure 3:
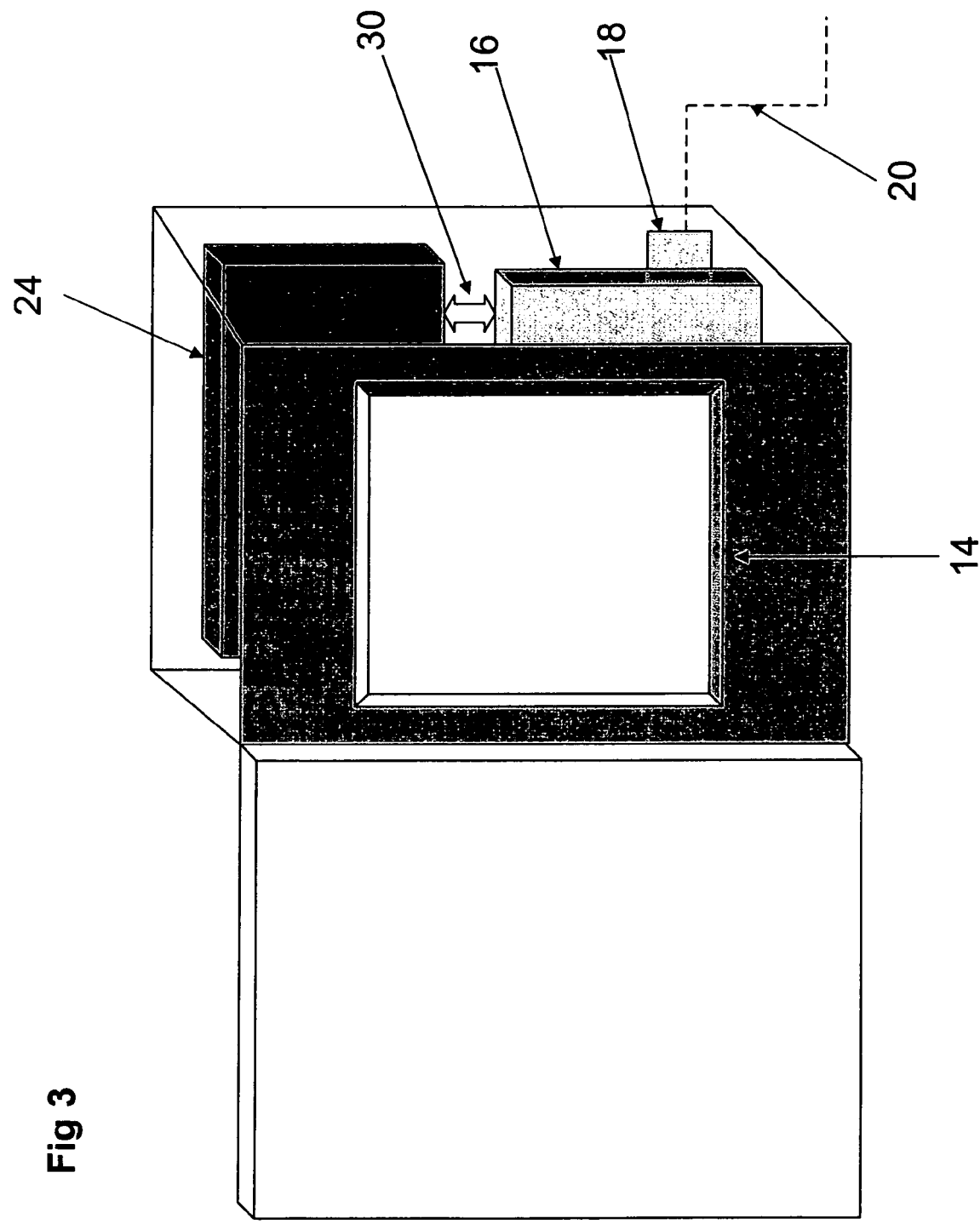
FIG. 3 is a simplified diagram illustrating a mass storage device inside the photo album according to a preferred embodiment of the present invention.

Reference is now made to FIG. 3, which is a simplified diagram illustrating how a mass storage device may be located inside the photo album according to a preferred embodiment of the present invention. FIG. 3 is analogous to FIG. 1 expect that it contains mass storage device 24 for storage of digital images received by the electronic processing device 16 at data input port 20. Parts that are the same as in FIG. 1 are given the same reference numerals and are not referred to again except as necessary for an understanding of the present embodiments. Arrow 30 indicates the flow of image data from the electronic processing device 16 to the storage device 24. The image data received by the processing device may be stored first in the storage device and then viewed conveniently later. Alternatively, digital photos may be viewed and then stored in the storage device, for subsequent retrieval as desired. Further, digital images stored in the storage device may be sent through the USB port to a printer or other external device, and can further be categorized in the storage device according to folders. The photos may be saved to the storage folders by date, subject, or other field. In order for the stored images to be viewed on the display, they are typically transferred to the electronic processing device from the mass storage device. As shown in FIG. 2, the electronic processing device interfaces with the display, preferably a high contrast back light TFT LCD display. The mass storage device may be a hard disk. Alternatively, the mass storage device may be a disk on key, in which case the mass storage device is removable. In an embodiment, the mass storage device comprises flash memory.

Figure 4:
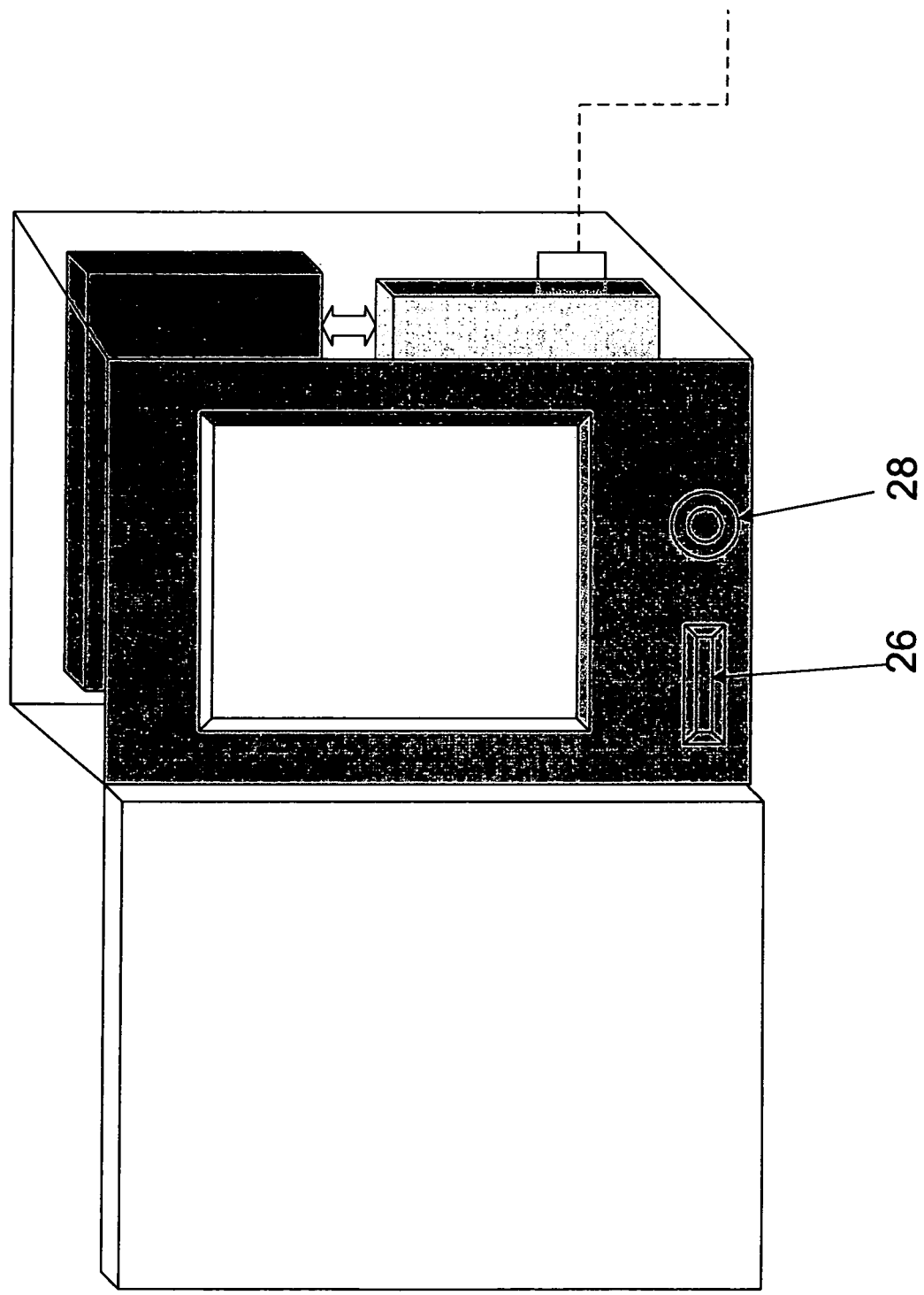
FIG. 4 is a simplified diagram illustrating an on/off switch and microphone in accordance with a preferred embodiment of the present invention.

Reference is now made to FIG. 4, which is analogous to FIG. 3. The additional features seen in FIG. 4 are the on/off switch 26, and the microphone/speaker 28. The remaining features in the figure have been discussed in previous embodiments. The functionality of this embodiment is as follows. Upon opening cover 12, the on-off switch 26, which may be a contact sensor, is activated, causing the DC power to be turned on. Preferably, switch 26 is a contact sensor, but other mechanical or optical implementations such as an on/off button or light sensor may be used as well. The on-off button is preferably activated by opening and closing of the cover 12. Power is preferably received from rechargeable batteries. Typically an LED light shows the battery power status. For example a blinking red light may appear when the album needs to be charged, a constant red light when in the charging mode, and a constant green light when charging is completed. Power is turned on by opening the album, thus activating the light sensor 26. The album has an operating system which is preferably invoked upon power up. Preferably the operating system calls a default startup screen to be shown on the display. The user, through soft buttons on the display, may then input instructions to the DPA. Conversely, closing the cover 12 preferably causes the operating system to shut down and then turns the DC power off. In an embodiment, when the DPA is left open for a certain defined time period without user input, the DC power is automatically turned off.

Microphone/speaker 28 provides the album with the feature of voice enhanced pictures. That is to say, in a particular embodiment, a digital voice recording may be input through the input port 20, possibly stored on the storage device, and associated with a particular picture. The voice recording can then be heard while viewing the picture, imparting an added feature to the DPA. The voice recording can be used to give titles to the pictures or to provide some explanatory narrative to go with the pictures as desired.

Figure 5:
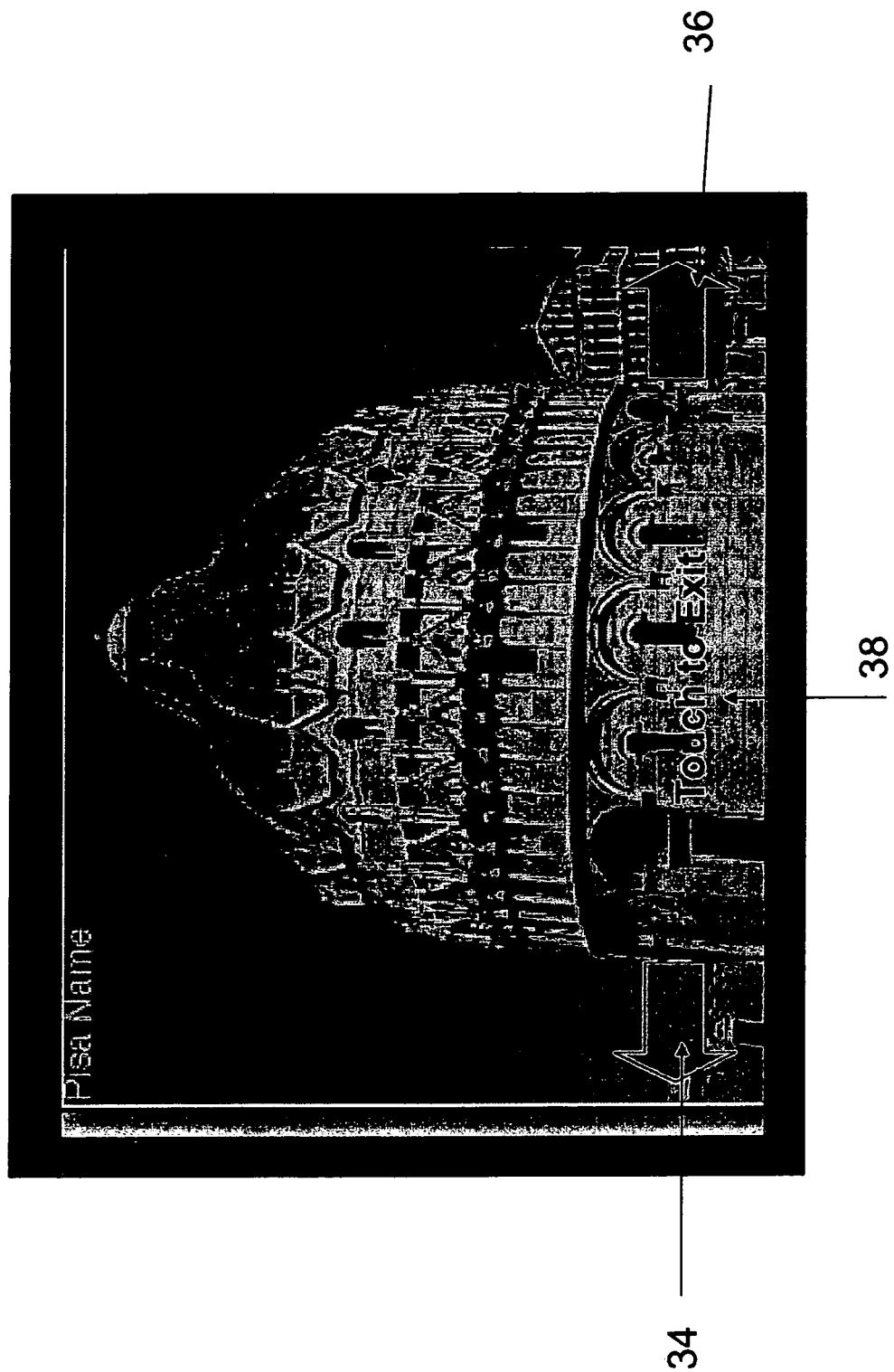
FIG. 5 is a view of a touch screen with soft buttons according to embodiments of the present invention.

Reference is made to FIG. 5, which is a view of a touch screen with soft buttons according to embodiments of the present invention. Shown are three buttons, right arrow 34, left arrow 36 and touch to exit button 38. The touch screen is used to interface with the album. In embodiments, the screen display may comprise a soft alphanumeric keyboard for text input by the user. The operating system preferably supports both an advanced and simple mode for display, depending on user preference, as explained above. The advanced mode is designed for users that desire more sophisticated features, while the simple mode is for users that desire only the most basic features of the DPA.

In an additional embodiment, video clips may be stored and played back by the DPA on the screen. In such an embodiment, a video data port may be added to the backside of the DPA to enable transfer of video clips to and from an external source.

Figure 6:
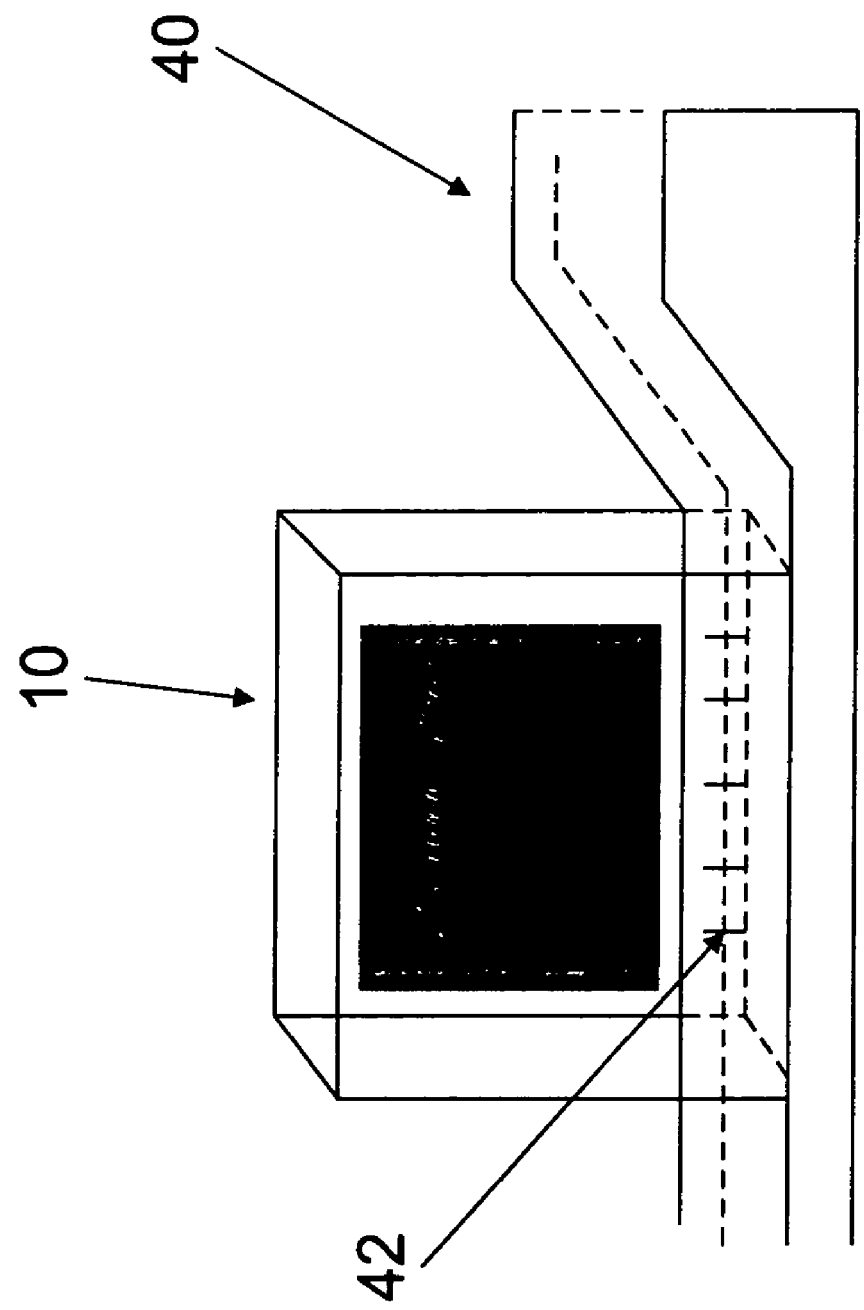
FIG. 6 is a view of a charging device in accordance with a particular embodiment of the present invention.

Reference is made to FIG. 6, which shows a docking device 40 in which the DPA may be charged, preferably using a low current. Recharging is accomplished by small metal chips 42 on the back cover. The DPA 10 is simply slipped into the docking device when needed, for example when the LED indicator referred to above shows a blinking red light as explained above. The metal chips 42 on the back cover of the DPA are parallel to metal conductors welded onto the docking device. When the DPA is slipped in to the docking device properly, the metal chips 42 receive electric charge which is transferred to internal batteries in a compartment on the backside of the album. The back cover may also contain an additional compartment for holding a cable, possibly a USB cable for connecting to a digital camera.

Figure 7:
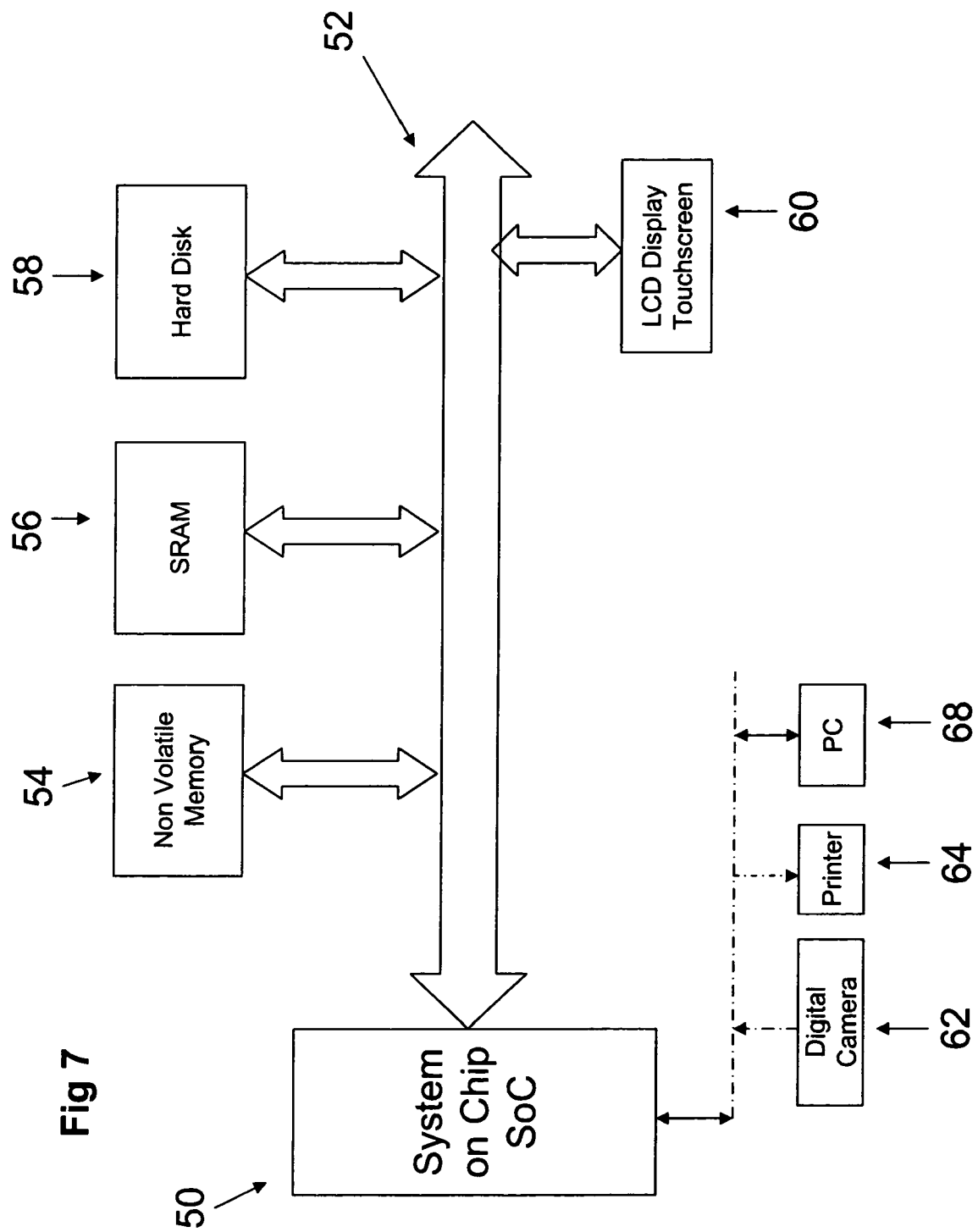
FIG. 7 is a schematic view of the DPA electronic system.

Reference is made to. FIG. 7, which is a schematic view of the DPA's components. The main electronic processing device is what is referred to as a System on a Chip SoC 50, which is connected via main bus 52 to non volatile memory 54, SRAM 56, and a hard disk 58. The LCD display touch screen 60 also shares the same bus. The USB port on the back side of the DPA may be connected to any one of several possibilities, including digital camera 62, Printer 64, or PC 68. The SRAM 56 is used for temporary storage of programs when the DPA is in use. The Hard Disk 58 stores all pictures and relevant data bases. The non volatile flash memory 54 stores the operating system and other applications when DPA is turned on.

Reference is made to FIG. 8, which shows a flow chart for the operation of the DPA. When the user opens the album for the first time, an initial introduction user interface (UI) screen appears, preferably querying the user to choose between a default and help screen. After the initial use, the user receives the default screen directly upon opening the DPA. If so desired, from the default screen the user may return to the help screen to access advanced mode. When the help screen is accessed, a screen appears showing two soft button options for the user to choose from, "regular mode" and "advanced mode". If the advanced mode soft button is pressed, the user is taken to an advanced mode screen as described below. When in advanced mode, the user may choose help to return to default mode. If, on the other hand, the regular mode button is pressed, the user is taken to the default screen. When the default screen is chosen, a screen appears with several soft buttons to choose from and a default picture is shown on the screen background. The user may search the database of already uploaded pictures, or he may choose the soft button camera which instructs the user in connecting his or her camera to the DPA. The rename and delete functions are provided as soft buttons, to allow the user to delete and rename pictures accessed from the default screen, either currently being uploaded or saved in the DPA.

Once the camera is connected, the user interface screen instructs the user how to load pictures from the camera. After the pictures are loaded, the user is returned to the default screen. Likewise, in the case where a search is carried out of already stored pictures, the user is returned to the default screen after the search is completed. From the default screen, the user then decides which of several viewing options he desires, typically slide show or full screen. He also may remain in default mode for picture viewing. After all pictures in the chosen file have been displayed in full screen or slide show mode, the user preferably returns to the default display screen.

Reference is made to FIG. 9a, which is a simplified view of the default display user interface touch screen. The top of the screen has soft buttons 70 and 72 for choosing between a slide show or a full screen view, respectively. Additional buttons typically include "rename" 74, for renaming a shown picture, and "search" 76 for conducting a search of stored picture files. When a picture or group of pictures are uploaded to the DPA, the user is prompted to input the date of each picture taken and the picture name. In addition, the user may group pictures together under one file, this file being called a "roll name." The date the picture was taken, roll name, picture name, and picture count are displayed as well on the top of the screen. The bottom row of the screen shows right and left arrows 80 for advancing to the next picture or going back to the previous picture. In an embodiment, when the user touches the picture itself rather than one of the soft buttons, the mode automatically changes to zoom. The user touches the screen a second time to zoom out and return to normal picture size. Finally, if the user presses on help, a help mode is displayed with touch buttons.

Reference is made to FIG. 9b, which shows a simplified display in zoom mode. When the user touches the screen, the user can toggle between zoom in and zoom out. The soft arrows 82 along the four edges are for moving around the image.

Reference is made to FIG. 9c, showing a flow chart and example screens for search mode, which may be accessed from the default display screen. Search mode allows the user to search for pictures stored in the DPA. Three options typically are provided for searching: either by roll name, picture name, or date. For each of these options a screenshot is shown for data entry, and the screenshot is adjacent the processing flow. The screenshot shows a keyboard for data entry by a user. Above the keyboard are three rows. The first row allows for user to input a roll name. The second and third lines allow for picture name and date input respectively. The upper keyboard 84 shows a screen with the roll name line highlighted, indicating the album is waiting for the user to input a desired roll name. The DPA then searches for pictures based on their saved roll names. The roll names matching the search are displayed. The second keyboard 86 is another option, showing the picture name line highlighted, indicating that the search will be carried out based on a user input picture name. The DPA then searches for pictures based on their saved picture names. The file names according to picture matching the search are displayed. Finally, the lower keyboard 88 is the UI screen for searching for all pictures in a range of dates. When a search is carried out by date, the user is prompted to choose from all pictures in a date range. Once a picture is chosen, it is displayed in the default display mode.

Figure 10:
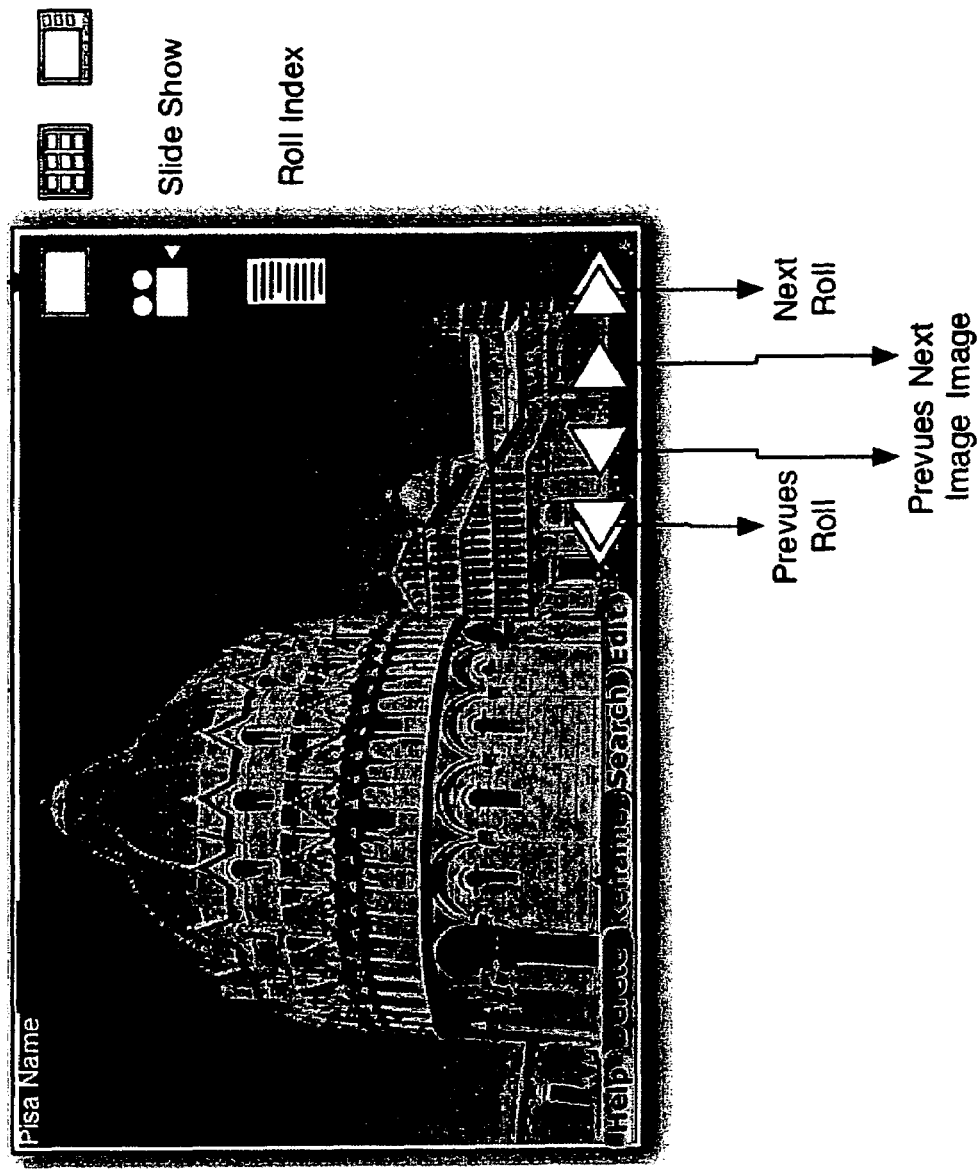
FIG. 10 shows a typical display screen using advanced user mode with additional soft buttons.

Reference is made to FIG. 10, which shows a typical display screen 90 using advanced user mode. Advanced user mode is preferably accessed from the help menu, as explained above. Icons appear on the screen indicating various modes of display, for example thumb view, slideshow, full screen, and roll index. These icons are explained in later figures. Arrows at the bottom of the screen allow for scrolling between pictures or between picture rolls. Likewise, soft buttons exist for rename, delete, search, edit, and help.

Figure 11A:
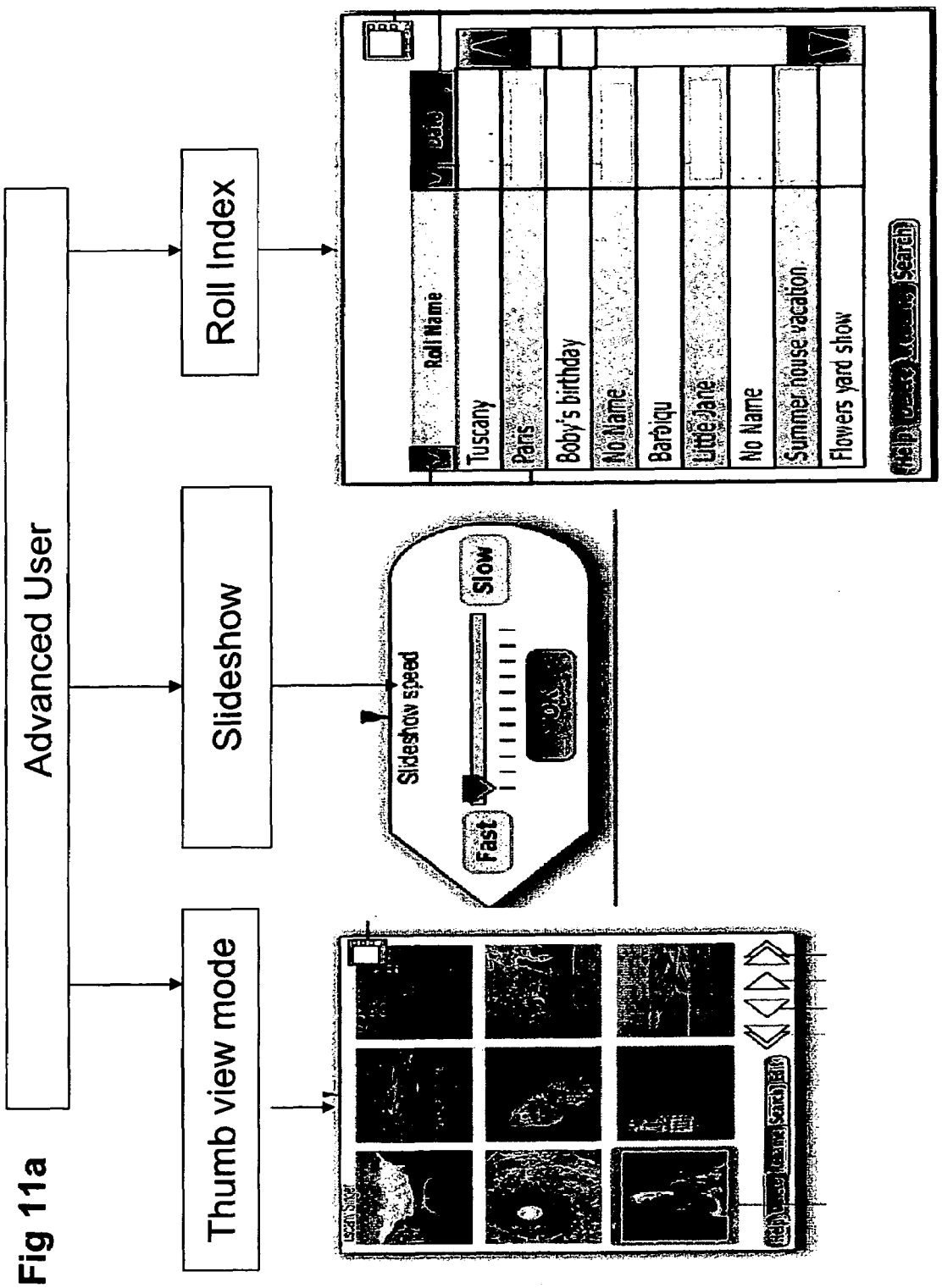
FIG. 11A is a flow chart showing screens for thumb view, roll index, and slideshow which may be accessed through the advanced screen of FIG. 10.

Reference is made to FIG. 11a, which shows screens for thumb view 92, roll index 94, and slideshow 96. FIG. 11A illustrates three different view modes that are available in the advanced mode referred to above, namely thumb view mode, slideshow mode and roll index mode. The thumb view mode simply allows the user to see all desired pictures, reduced in viewing size, on one screen. The roll index is a list of picture "rolls" or files containing multiple related pictures. The user may choose from one of the files by simply pushing on the area of the screen where the roll name appears. The slideshow screen contains an icon bar that allows the user to determine the speed of the slide show. The icon bar can be adjusted by pressing on the "fast" or "slow" soft buttons, thus moving the arrow on the scale. The slideshow preferably takes place in full screen mode.

Figure 11B:
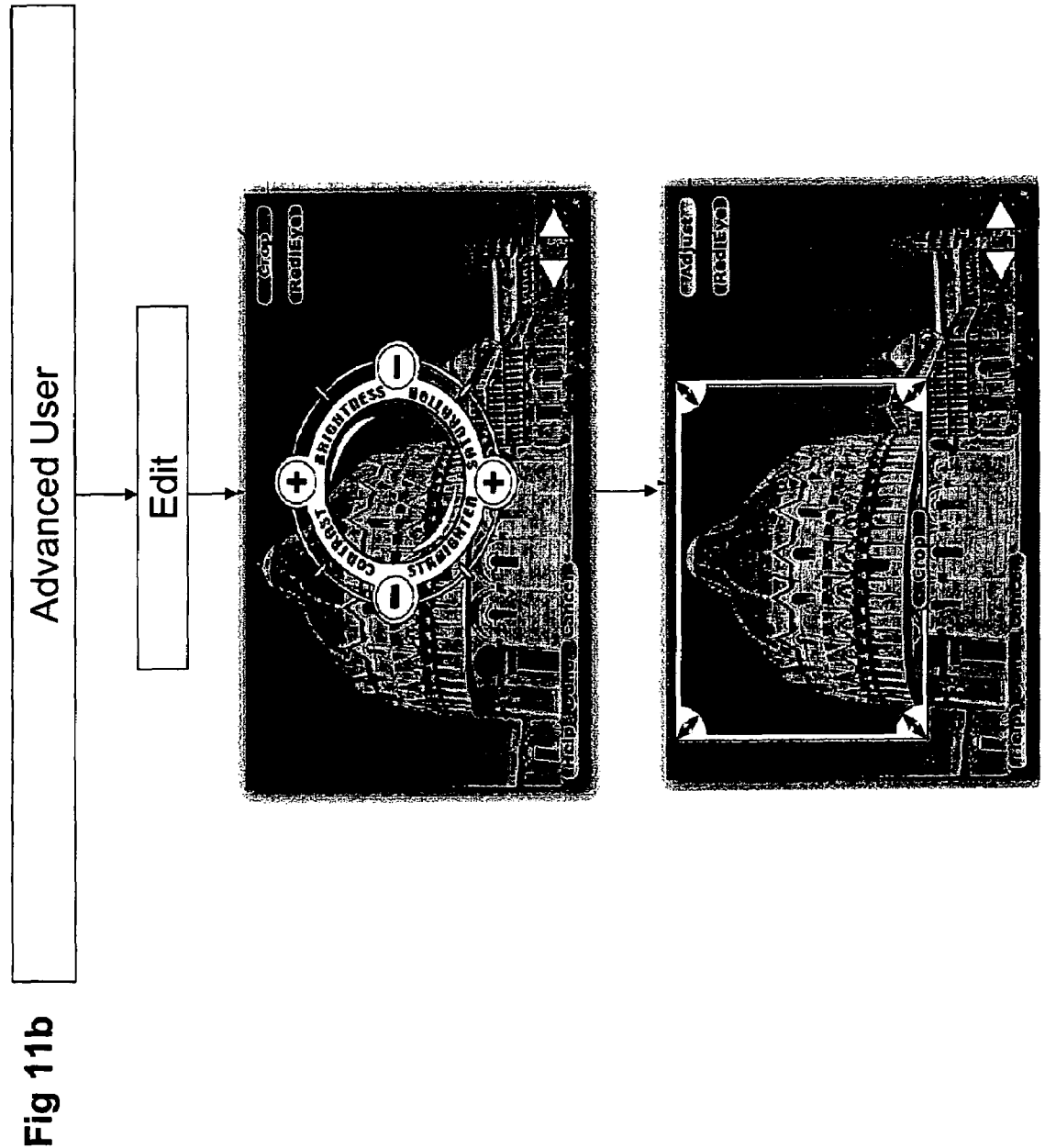
FIG. 11B shows an image edit option which is entered through the advanced user mode.

Reference is made to FIG. 11b, which shows an edit option for advanced user mode. The edit option allows selected editing actions on the photographs. An edit screen is accessed in the advanced user mode by pressing the "edit" soft button shown at the bottom of the advanced user default display, shown in FIG. 10. The edit screen shows a soft button dial 98 for adjusting the contrast, brightness, saturation, and alignment of the image displayed. A cropping option 100 is shown on the lower image. The cropping option allows the user to select and cut a certain area of the image. This area can then be viewed with zoom, downloaded to a mobile storage device, or printed.

Figure 11C:
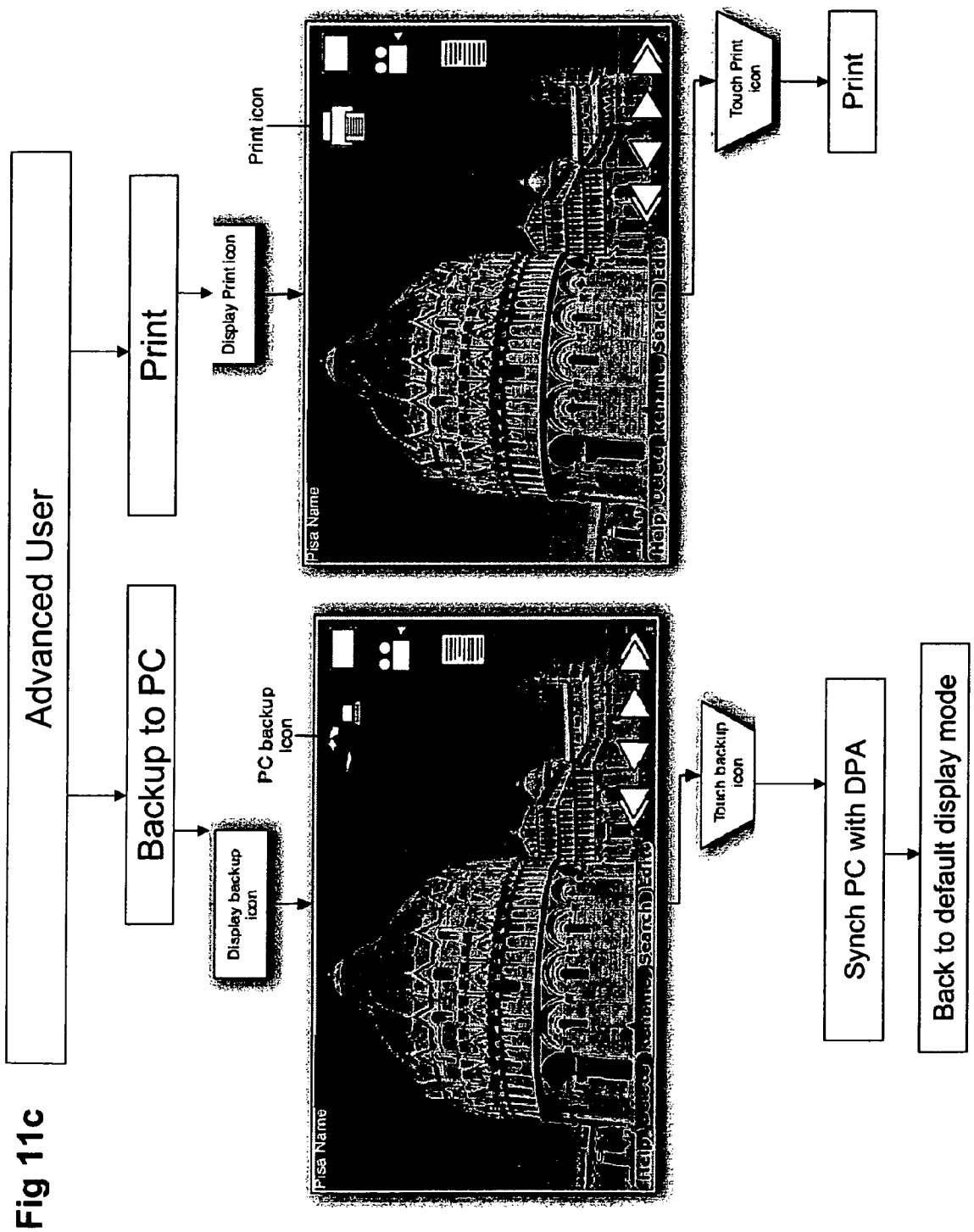
FIG. 11C shows backup to PC and print screens of the advanced user mode.

Reference is made to FIG. 11c, which shows the "backup to PC" and "print" screens of the advanced user mode. In the print option the album automatically detects that a printer is available and a print icon 102 is automatically displayed on the screen. Likewise, when a PC is connected to the album, the PC is automatically detected and a PC backup icon 104 is automatically displayed. The user presses on the soft icon to execute the desired command. At the end of the command, the screen returns to the default display.

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A box structure with an external appearance of a photo album and configured to electronically display digital images, said structure comprising:

a front cover for said box structure, said cover being connected to said box structure along an edge such that said cover is configured to pivot along said edge;

a data input port to receive incoming data of images for display;

an electronic data processing device, located within said box and connected to said input port, configured to receive said incoming data from said input port and process said incoming data; and a display associated with said processing device configured to display said electronic images and disposed on said box structure, said display being touch-sensitive and comprising a touch screen compatibile user input including a soft keyboard, the soft keyboard comprising both keys for navigating through multiple electronic images of a picture collection and keys for text input, said keys for text input being operatively associated with file management of said picture collection, wherein said keys for text input are further associated with a searching unit for inputting picture search criteria for a search of said picture collection.

2. The structure of claim 1, wherein said display is disposed on said box structure against said front cover such that upon opening said front cover said display is visible.

3. The structure of claim 1, further comprising a mass storage device associated with said processing device.

4. The structure of claim 3, wherein said mass storage device is a hard disk.

5. The structure of claim 3, wherein said mass storage device is a flash memory.

6. The structure of claim 3, wherein said mass storage device is a disk on key.

7. The structure of claim 1, wherein said navigating comprises scrolling functionality for scrolling through a picture collection.

8. The structure of claim 1, wherein said file management comprises picture editing functionality for editing a picture collection.

9. The structure of claim 1, wherein said navigation keys comprise soft icons for selecting between navigation functions to navigate through a collection of images.

10. The structure of claim 1, wherein said data input port is a USB port.

11. The structure of claim 1, wherein said data input port is configured to receive wireless data.

12. The structure of claim 1, wherein said data input port comprises an Internet connection.

13. The structure of claim 1, wherein said box structure further comprises a sensor switch that is activated by the lifting of said front cover, and deactivated by the closing of said front cover on said box structure.

14. The structure of claim 1, further comprising a microphone.

15. The structure of claim 1, comprising:

an electronic data processing device, located within said box, a touch screen user interface associated with said processing device configured to display said electronic images and interact with said user, said touch screen being disposed on said box structure said touch screen user interface being configured to provide a soft keyboard.

16. The structure of claim 15, wherein said touch screen user interface is disposed on said box structure against said front cover such that upon opening said front cover said display is visible.

17. A picture frame configured to electronically display digital images of a picture collection, said picture frame comprising:

a data input port to receive incoming data of images for display;

an electronic data processing device, located within said picture frame and connected to said input port, configured to receive said incoming data from said input port and process said incoming data; and a display associated with said processing device configured to display said electronic images and disposed within said picture frame the display further comprising a touch screen user interface associated with said processing device configured to display said electronic images and interact with said user, said touch screen user interface being configured to provide a soft keyboard, the soft keyboard comprising both keys for navigating through multiple electronic images of a picture collection and keys for text input, said keys for text input being operatively associated with file management of said picture collection within said picture frame, and wherein said keys for text input are further associated with a searching unit for imputing picture search criteria for a search of said picture collection.

* * * * *

(12) EX PARTE REEXAMINATION CERTIFICATE (10041st)
United States Patent
Shuhami

(10) Number: US 7,411,578 C1
(45) Certificate Issued: Feb. 12, 2014

(54) DIGITAL PHOTO ALBUM

(75) Inventor: Jacob Shuhami, Moshav Beit Yitzhak (IL)

(73) Assignee: Displeigh LLC, Longview, TX (US)

Reexamination Request:
No. 90/012,774, Jan. 29, 2013

Reexamination Certificate for:
Patent No.: 7,411,578
Issued: Aug. 12, 2008
Appl. No.: 11/400,225
Filed: Apr. 10, 2006

Related U.S. Application Data

(60) Provisional application No. 60/671,478, filed on Apr. 15, 2005.

(51) Int. Cl.
*G09G 5/00* (2006.01)

(52) U.S. Cl.
USPC ....... 345/156; 345/173; 348/333.05; 434/317

(58) Field of Classification Search
None
See application file for complete search history.

(56) References Cited

To view the complete listing of prior art documents cited during the proceeding for Reexamination Control Number 90/012,774, please refer to the USPTO's public Patent Application Information Retrieval (PAIR) system under the Display References tab.

*Primary Examiner* — Zoila Cabrera

(57) ABSTRACT

A box structure with an external appearance of a photo album and configured to electronically display digital images, the structure comprising: (a) a front cover for the box structure, the cover being connected to the box structure along an edge such that the cover is configured to pivot along the edge; (b) a data input port to receive incoming data of images for display; (c) an electronic data processing device, located within the box and connected to the input port, configured to receive the incoming data from the input port and process the incoming data; and (d) a display associated with the processing device configured to display the electronic images and disposed on the box structure against the front cover such that upon opening the front cover the display is visible.

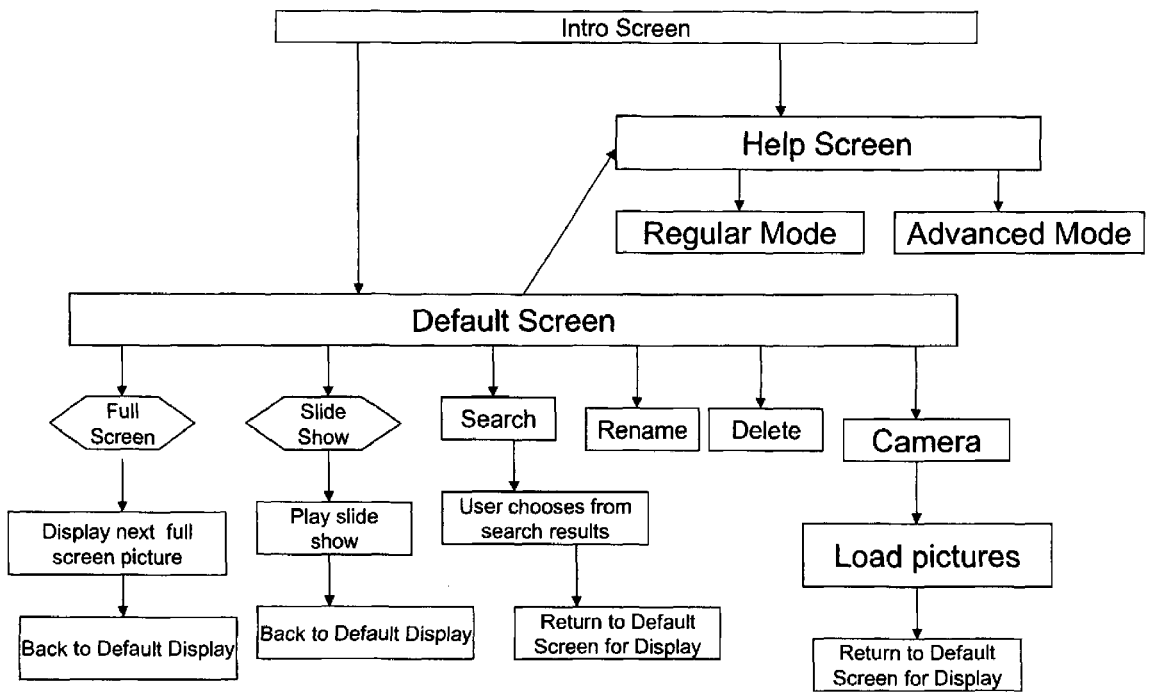

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 17 is cancelled.

Claims 1-16 were not reexamined.

\* \* \* \* \*